(12) United States Patent
Wang (10) Patent No.: US 7,726,980 B1
(45) Date of Patent: Jun. 1, 2010

(54) SOCKET FOR A BASELESS VEHICLE LIGHT

(75) Inventor: Jun-Ren Wang, Tainan (TW)

(73) Assignee: Lucidity Enterprise Co., Ltd., Tainan (TW)

( * ) Notice: Subject to any disclaimer, the term of this patent is extended or adjusted under 35 U.S.C. 154(b) by 0 days.

(21) Appl. No.: 12/616,790

(22) Filed: Nov. 12, 2009

(51) Int. Cl.
*H01R 12/00* (2006.01)

(52) U.S. Cl. ................ 439/76.1; 439/36; 439/276

(58) Field of Classification Search ........... 439/76.1, 439/34, 36, 276, 936
See application file for complete search history.

(56) References Cited

U.S. PATENT DOCUMENTS

| | | | | |
|---|---|---|---|---|
| 5,188,444 | A * | 2/1993 | Makita et al. ............ | 362/519 |
| 5,560,245 | A * | 10/1996 | Zettler et al. ............ | 73/335.01 |
| 6,319,045 | B1 * | 11/2001 | Sawayanagi et al. ..... | 439/374 |
| 6,511,328 | B2 * | 1/2003 | Molus et al. ............. | 439/76.1 |
| 6,616,480 | B2 * | 9/2003 | Kameyama ............... | 439/587 |

* cited by examiner

*Primary Examiner*—Tho D Ta

(57) ABSTRACT

The invention relates to a socket for a baseless vehicle light. The light includes a lens, a circuit board having plural through holes, and a socket. The socket possesses a plugging groove, two plugging holes formed in the plugging groove, a slot bored in each plugging hole, two terminals respectively inserted into one of the plugging holes, a conductive pin located at one end of each terminal to extend through the slot to connect with the circuit board, and plural connecting members set on one side to correspondingly engage with the through holes. A waterproof resin is injected into the lens to cover on the circuit board and the socket to keep the circuit board positioned in the lens. Thus, a plug of an vehicle is, not cut off, directly plugged into the socket, enabling the light conveniently installed in a vehicle.

6 Claims, 12 Drawing Sheets

SOCKET FOR A BASELESS VEHICLE LIGHT

BACKGROUND OF THE INVENTION

1. Field of the Invention

This invention relates to a socket for a baseless vehicle light, particularly to one able to be directly plugged by a plug of a vehicle power cable while installed in an vehicle, conveniently and quickly assembled.

2. Description of the Prior Art

Figure 1:
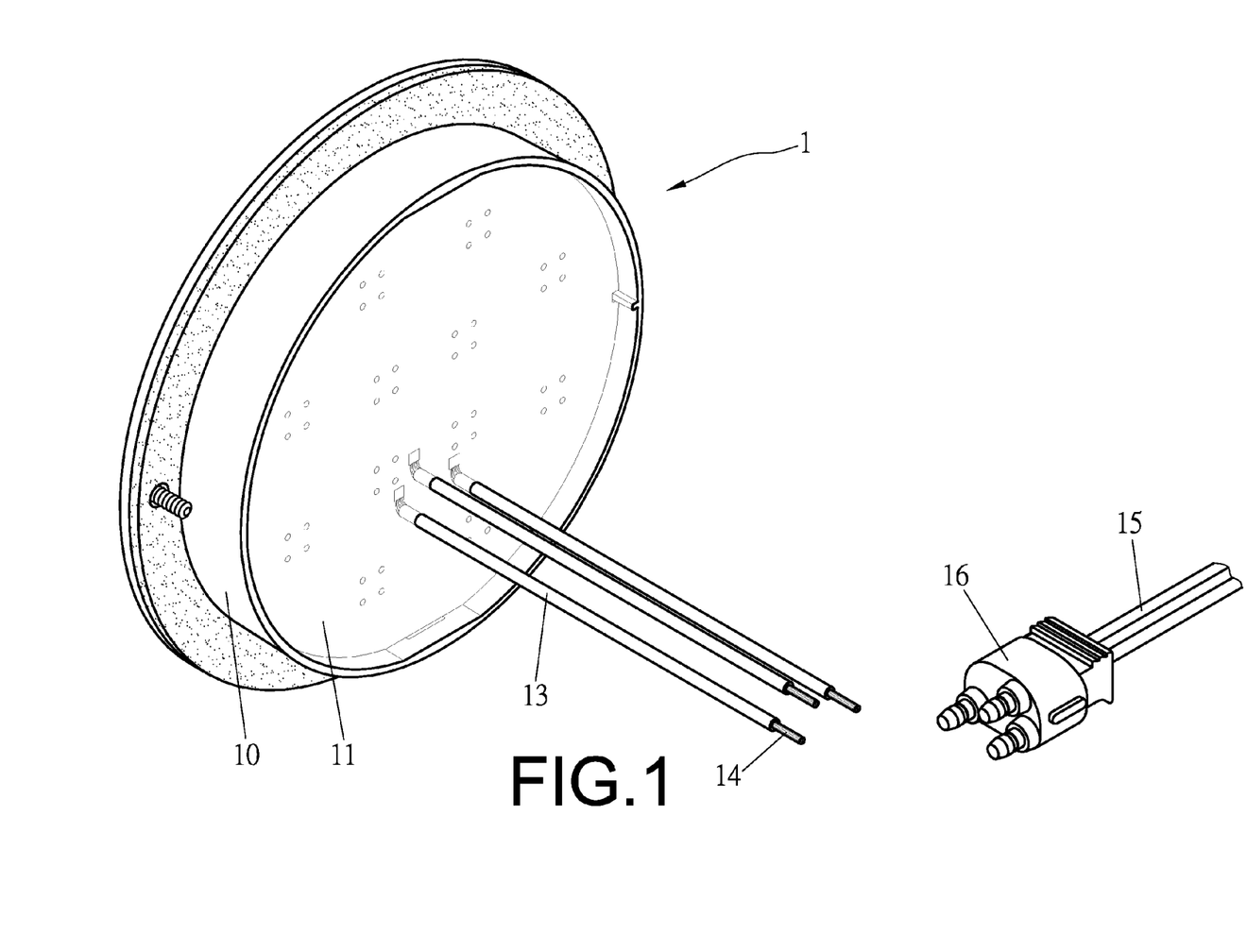
FIG. 1 is an exploded perspective view of a conventional baseless vehicle light and a plug of a vehicle power cable.
Figure 2:
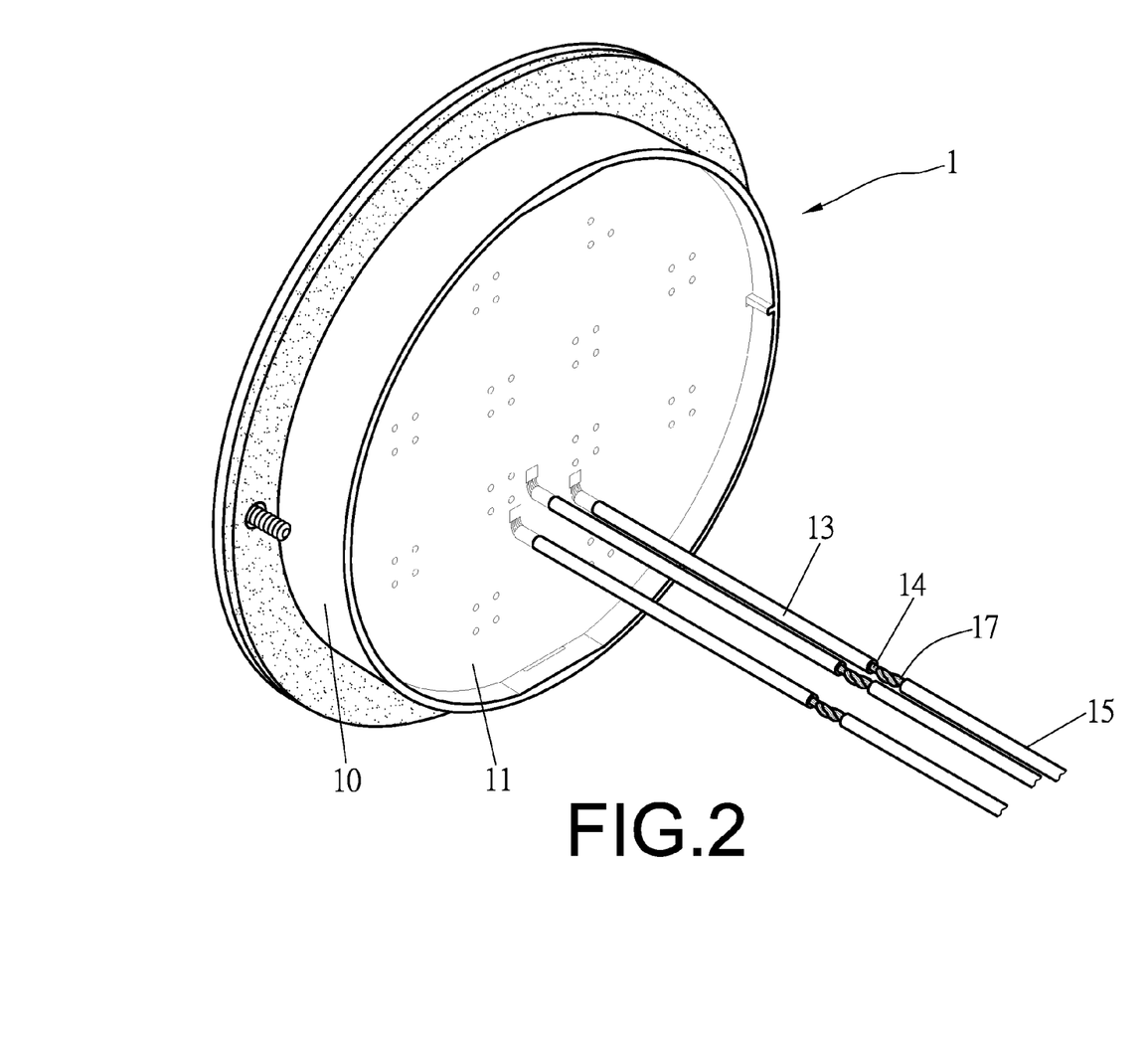
FIG. 2 is a perspective view of a conventional baseless vehicle light, showing it being connected with wires of the vehicle power cable after cut off the plug of a vehicle power cable.

Commonly, as shown in FIGS. 1 and 2, a conventional baseless vehicle light 1 includes a lens 10, a circuit board 11 installed inside the lens 10, plural LEDs 12 fixed on the circuit board 11, and at least two wires 13 planted on the rear side of the circuit board 11 by tin welding. Each of the wires 13 has a free bare end 14. Before the light 1 is installed in a vehicle, a plugging light 16 of a power cable 15 has to be cut off first, with each bare end 14 connected with a corresponding free bare end 17 of the power cable 15. However, as shown in FIG. 2, it takes time cutting off the plugging light 16 by a tool and connecting the bare ends 14 of the wires 13 with the bare ends 17 of the power cable 15. Moreover, the combined lines of the wires 13 and the power cable 15 may easily get entwined together to cause a difficulty for arrangement, and the connections of the bare ends 14 and the bare ends 17 are apt to be broken to pose a poor conductivity. Moreover, as the wires 13 are fixed on the circuit board 11 by tin welding, they can be easily pulled off the circuit board 11 to turn off the light 1.

SUMMARY OF THE INVENTION

The object of this invention is to offer a socket for a baseless vehicle light. A plug of an vehicle power cable is unnecessary to be cut off but directly plugged into the socket, thus convenient for installing the socket in an vehicle.

The light includes a lens, a circuit board installed in the lens, and a socket fixed on a rear side of the circuit board. The circuit board is provided with plural through holes. The socket possesses a plugging groove formed in one side, at least two plugging holes formed in the plugging groove, a slot bored in each plugging hole, at least two terminals respectively inserted into one of the plugging holes, a conductive pin located at one end of each of the terminals to extend through the slot to connect with the circuit board, and plural connecting members set on one side to correspondingly engage with the through holes of the circuit board. A waterproof resin is injected into the lens to cover on the circuit board and one side of the socket, so as to simultaneously keep the circuit board positioned in the lens.

BRIEF DESCRIPTION OF DRAWINGS

This invention is better understood by referring to the accompanying drawings, wherein.

DETAILED DESCRIPTION OF THE PREFERRED EMBODIMENT

Figure 3:
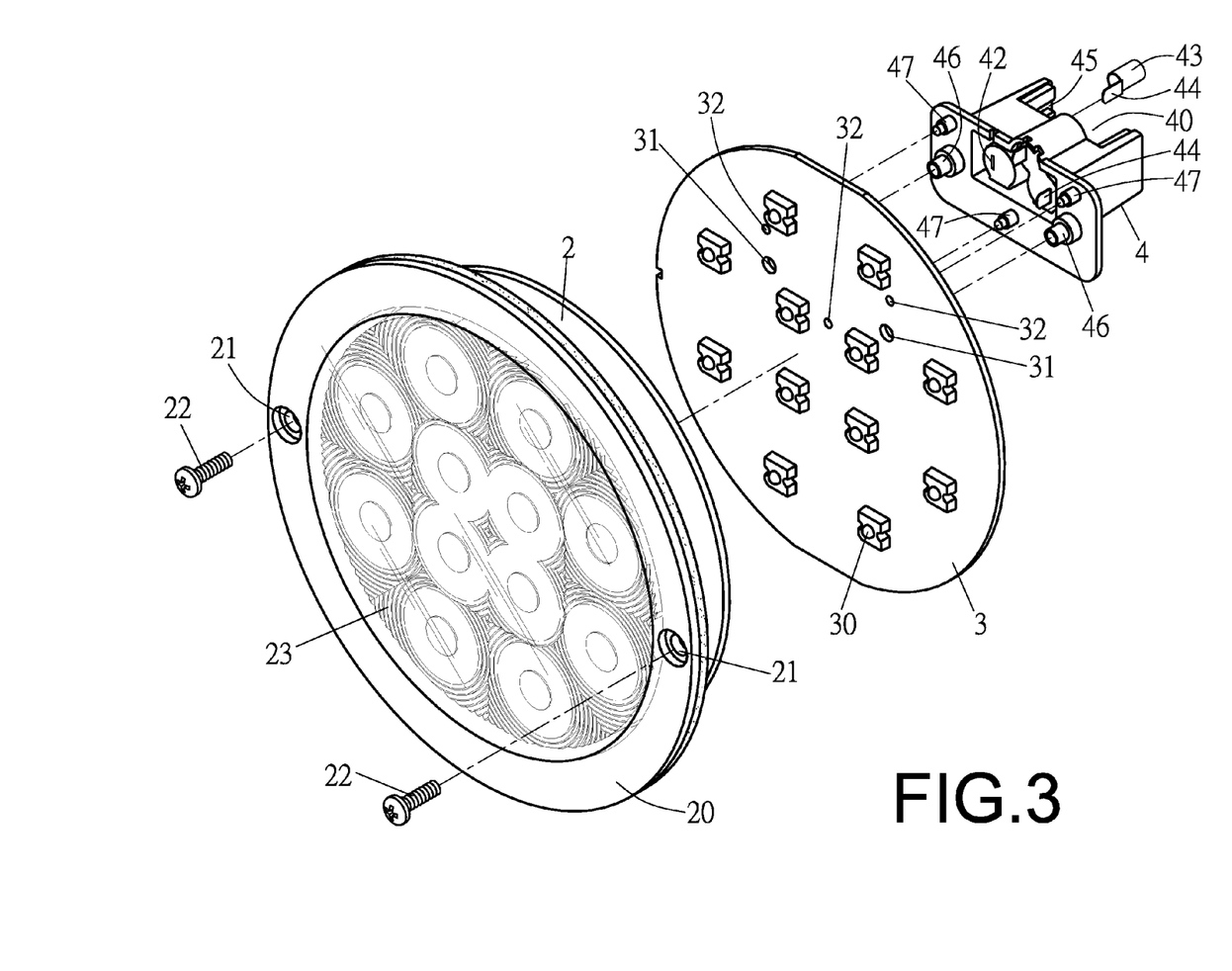
FIG. 3 is an exploded perspective view of a first preferred embodiment of a socket for a baseless vehicle light in the present invention.
Figure 4:
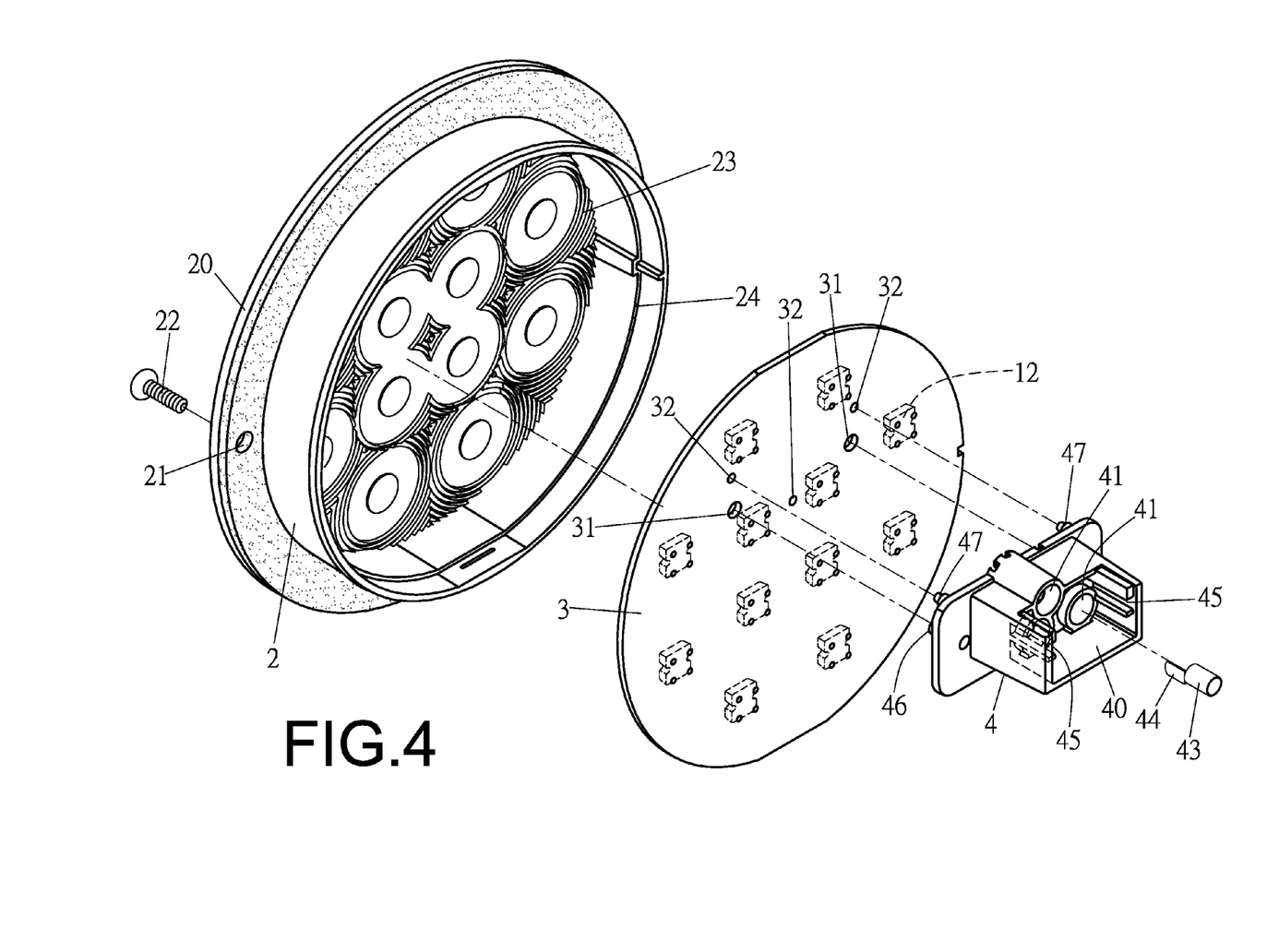
FIG. 4 is an exploded perspective view of the first preferred embodiment of a socket for a baseless vehicle light in the present invention, showing it being viewed from another angle.
Figure 5:
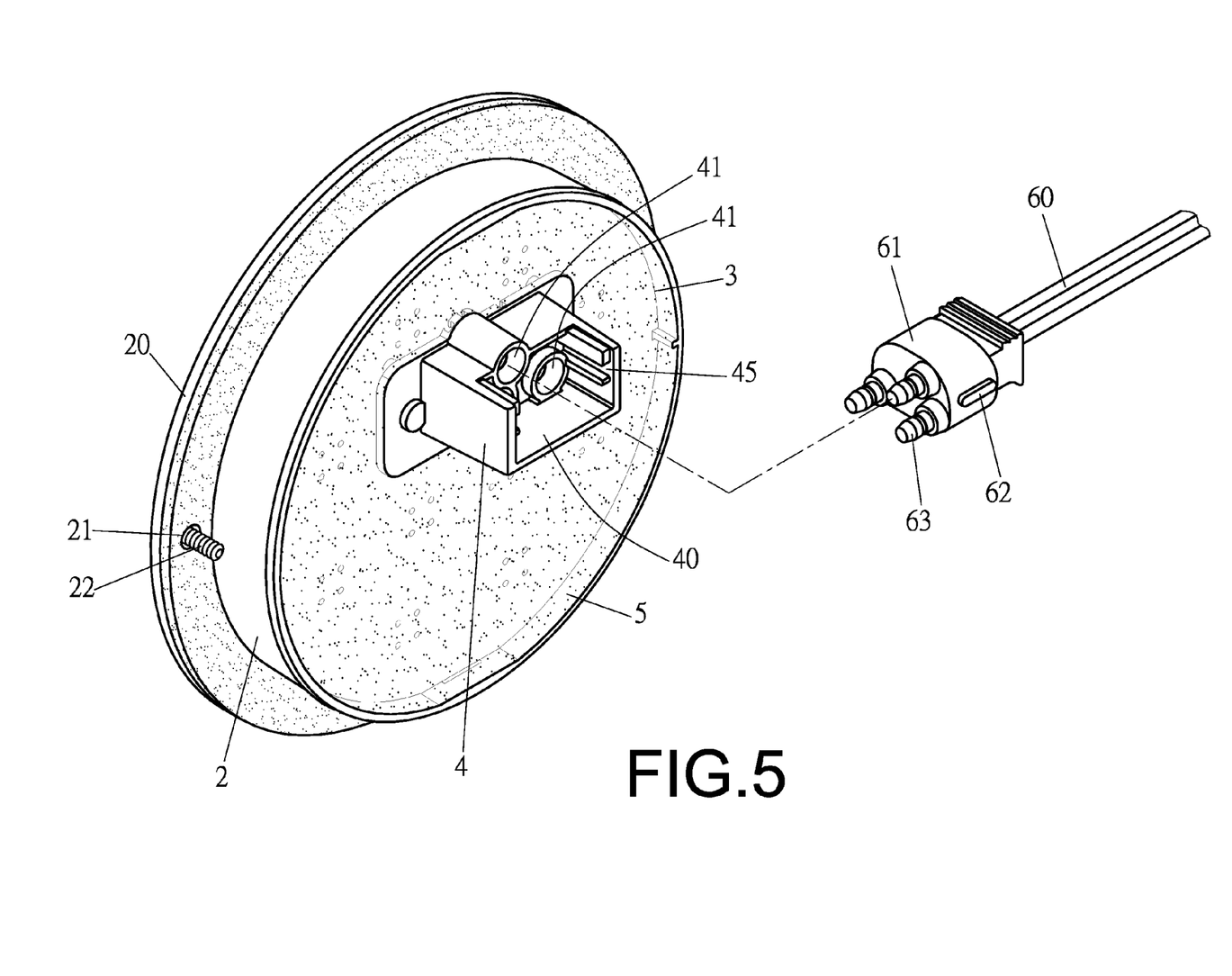
FIG. 5 is a perspective view of the first preferred embodiment of a socket for a baseless vehicle light in the present invention.
Figure 6:
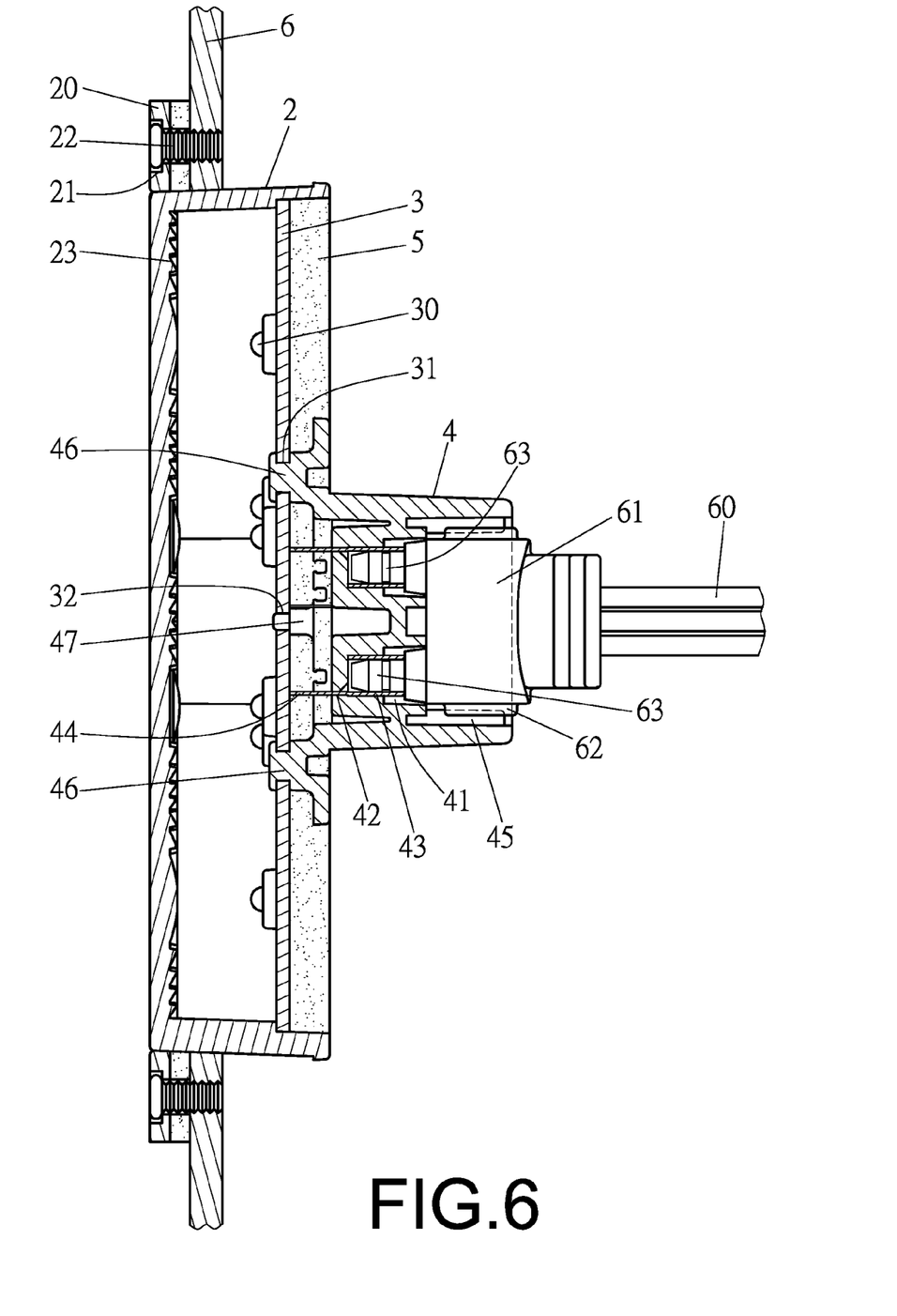
FIG. 6 is a cross-sectional view of the first preferred embodiment of a socket for a baseless vehicle light in the present invention.

FIGS. 3 and 4 show a first preferred embodiment of a socket 4 for a baseless vehicle light in the present invention. The baseless vehicle light includes a lens 2, a circuit board 3 deposited inside the lens 2, and the socket 4 fixed on the rear side of the circuit board 3.

The lens 2 is provided with an annular positioning sheet 20, at least two through holes 21 bored in the positioning sheet 20 for being inserted with bolts 22, a refractive surface 23 formed on an interior surface, and a locking circumference 24 formed in an inner sidewall.

The circuit board 3 is provided with plural LEDs 30, plural through holes 31 and at least a positioning hole 32.

The socket 4 is provided with a plugging groove 40 formed in one side, at least two plugging holes 41 formed in the plugging groove 40, and at least two terminals 43 respectively inserted into one of the plugging holes 41. Located at one end of each of the terminals 43 is a conductive pin 44, which is to be plugged through a slot 42 bored in the bottom of each of the plugging holes 41 to extend outward to connect with the circuit board 3. Further, a guiding groove 45 is formed in two corresponding sidewalls of the plugging groove 40 respectively. In addition, plural connecting members 46 are set on one side of the socket 4 to correspondingly engage with the to through holes 31 of the circuit board 3, and at least a projecting bar 47 is planted on the same side of the socket 4 to correspond to the positioning hole 32 of the circuit board 3.

In assembling, as shown in FIGS. 3-6, the socket 4 is primarily installed in the rear side of the circuit board 3, with the projecting bar 47 inserted in the positioning hole 32 and the connecting members 46 inserted through the through holes 31. Next, the free ends of the connecting members 46 are deformed by pressing so as to be fixed on the circuit board 3. The terminals 43 are connected with the circuit board 3, making the socket 4 fixed on the rear side of the circuit board 3. Then, the combined body of the circuit board 3 and the socket 4 is put into the lens 2, with the circuit board 3 locked in the locking circumference 24 of the lens 2. Finally, a waterproof resin 5 is injected into the lens 2 to enable the circuit board 3 and one side of the socket 4 sheltered by the waterproof resin 5 and fixed in the lens 2. The assembly of the baseless vehicle light is thus swiftly finished.

When the light is to be installed in an vehicle 6, it just needs to insert a plug 61 of a power cable 60 installed in the vehicle 6 into the plugging groove 40, with terminals 63 of the plug 61 inserted through the plugging holes 41 of the plugging groove 40 into the terminals 43 of the socket 4 by keeping a projecting strip 62 sliding in the guiding groove 45. Then, with the bolts 22 inserted through the through holes 21 of the lens 2 to fix with the vehicle 6, the light is thus quickly installed in the vehicle 6, saving not only time but also cost in installation.

The advantages of the invention are described as can be seen from the foresaid description. Unlike the conventional light 1, it is unnecessary to cut off the plug 61 of the power cable 60 of the vehicle 6, avoiding source wasting. The plug 61 can be firmly inserted in the socket 4 to prevent it from separating. With no wire soldered on the circuit board 3 by tin welding, power source of the vehicle 6 can stably provide power for the light. Moreover, with the waterproof resin 5 fully coated on the circuit board 3 deposited in the lens 2, the light of the invention can prolong its service life.

Figure 7:
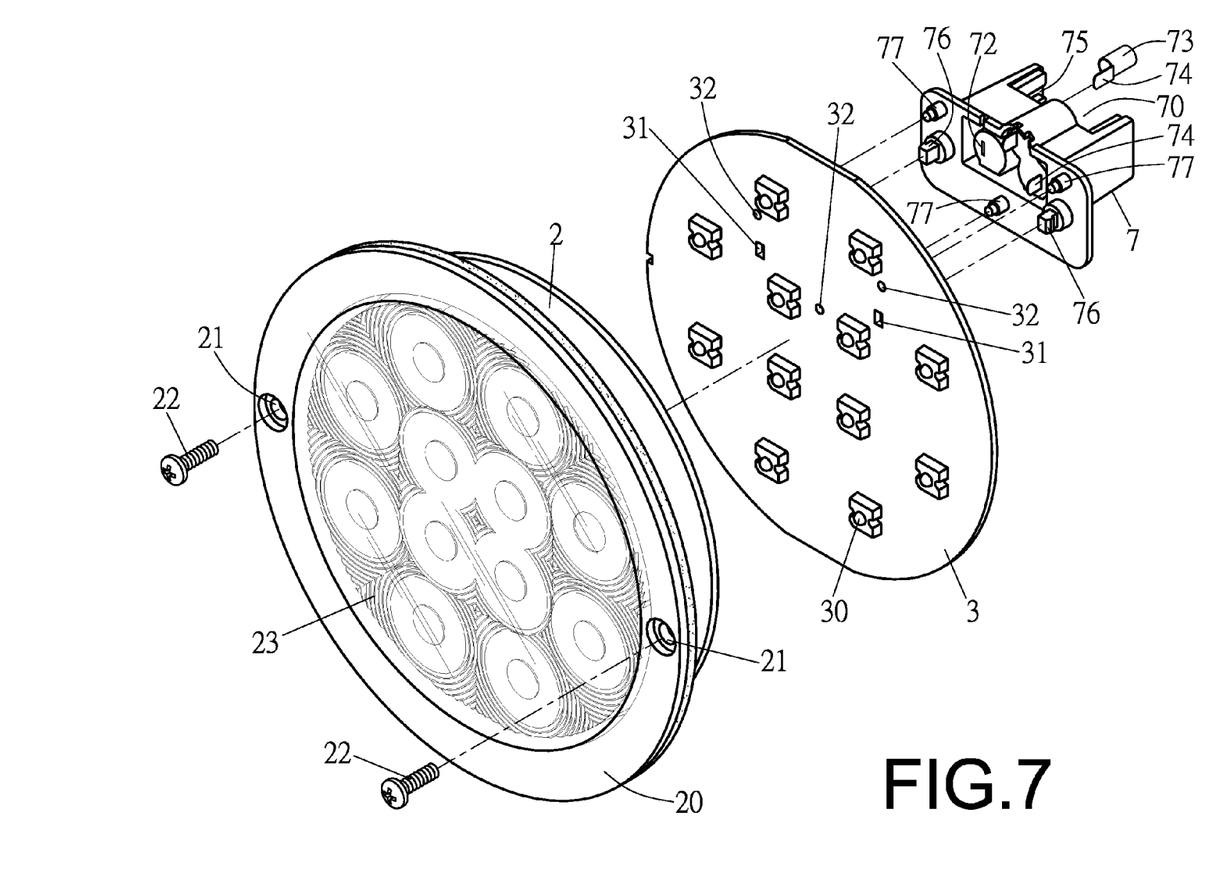
FIG. 7 is an exploded perspective view of a second preferred embodiment of a socket for a baseless vehicle light in the present invention.
Figure 8:
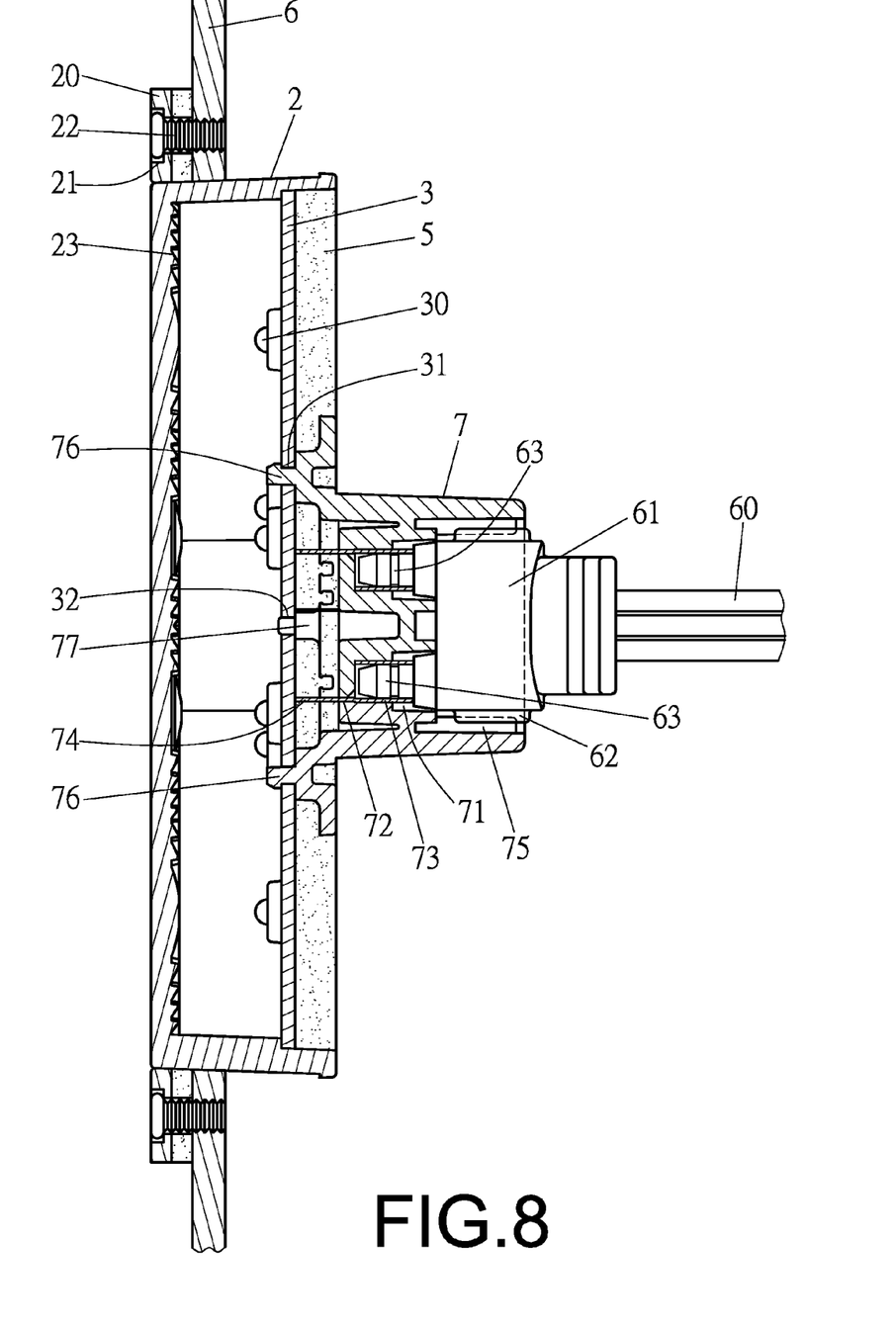
FIG. 8 is a cross-sectional view of the second preferred embodiment of a socket for a baseless vehicle light in the present invention.

FIGS. 7 and 8 show a second preferred embodiment of a socket 7 for a baseless vehicle light in the present invention. Like the previous embodiment, this preferred embodiment includes a lens 2, a circuit board 3 installed in the lens 2, and the socket 7 fixed on the rear side of the circuit board 3. The circuit board 3 is provided with plural through holes 31 and at least a positioning hole 32. The socket 7 is provided with a plugging groove 70 formed in one side, at least two plugging holes 71 formed in the plugging groove 70, and at least two terminals 73 respectively inserted into one of the plugging holes 71. Located at one end of each of the terminals 73 is a conductive pin 74, which is to be plugged through a slot 72 bored in the bottom of each of the plugging holes 71 to extend outward to connect with the circuit board 3. Further, a guiding groove 75 is formed in two corresponding sidewalls of the plugging groove 70 respectively. In addition, plural connecting members 76, formed as locking bodies, are set on one side of the socket 7 to correspondingly engage with the through holes 31 of the circuit board 3, as shown in FIG. 8, and at least a projecting bar 77 is planted on the same side of the socket 7 to correspond to the positioning hole 32 of the circuit board 3. Therefore, by means of the connecting members 76 of the socket 7 locked in the through holes 31 of the circuit board 3, the socket 7 can be quickly combined with the circuit board 3.

Figure 9:
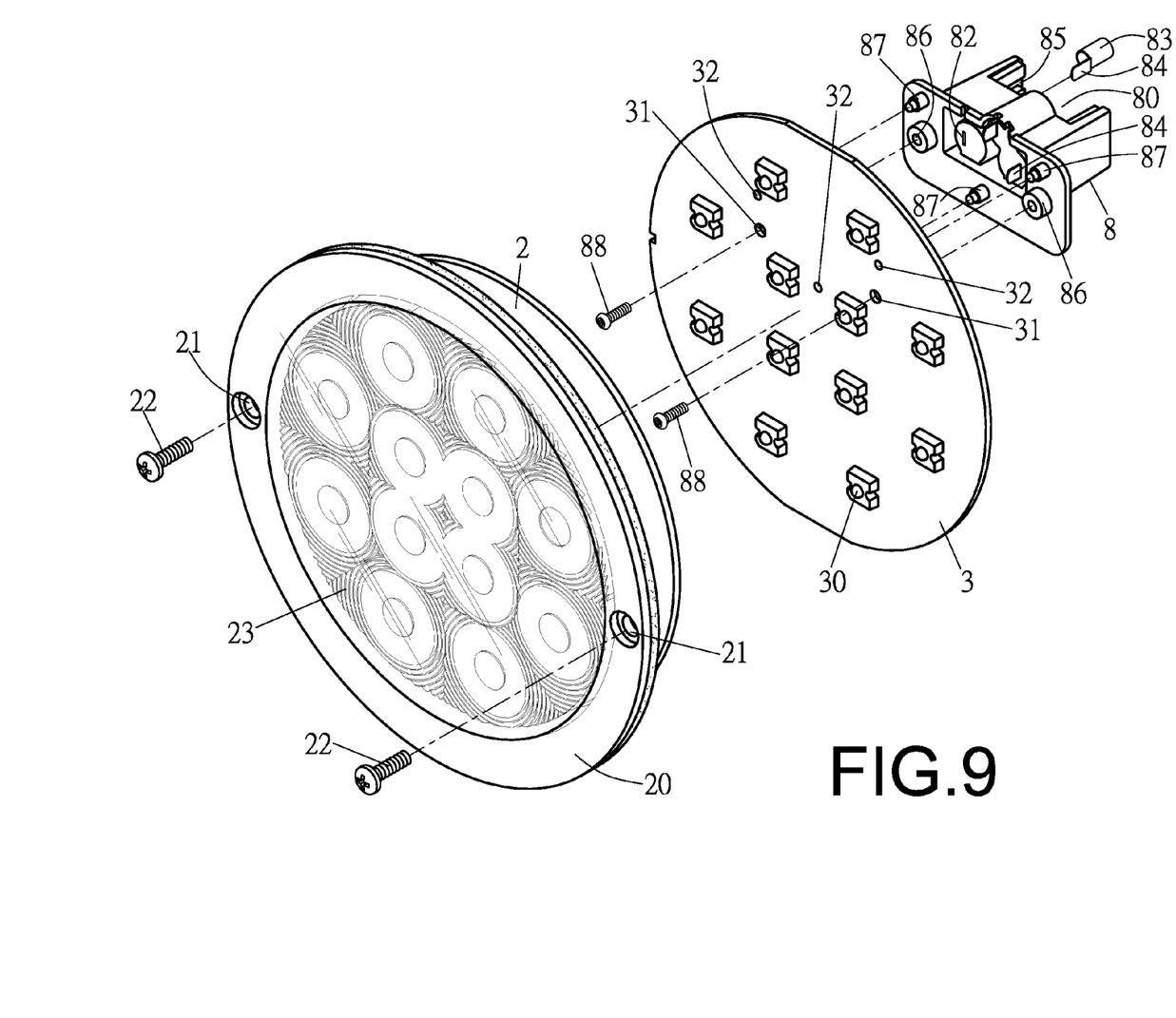
FIG. 9 is an exploded perspective view of a third preferred embodiment of a socket for a baseless vehicle light in the present invention.
Figure 10:
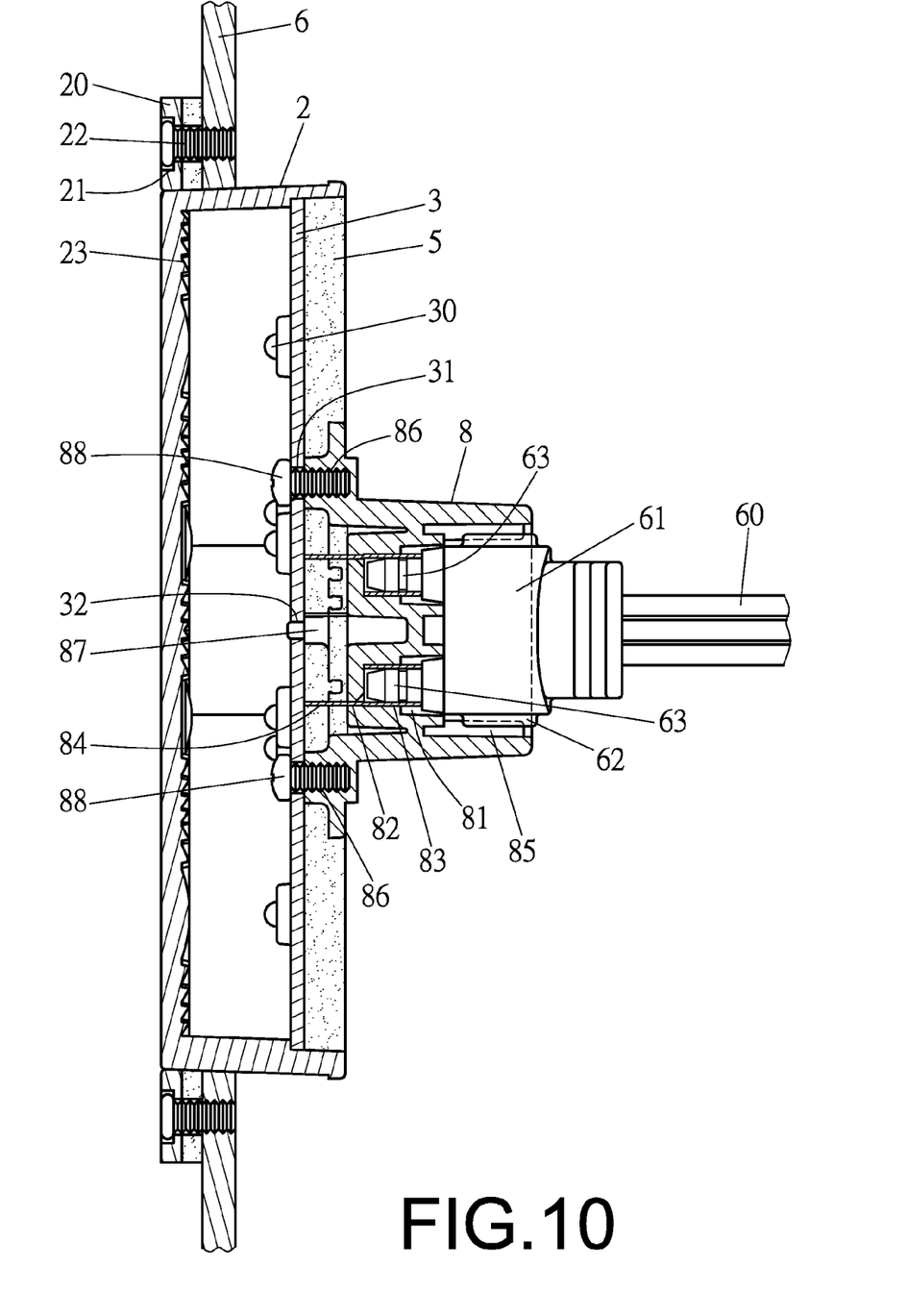
FIG. 10 is a cross-sectional view of the third preferred embodiment of a socket for a baseless vehicle light in the present invention.

Next, FIGS. 9 and 10 show a third preferred embodiment of a socket 8 for a baseless vehicle light in the present invention. Like the first embodiment, this preferred embodiment includes a lens 2, a circuit board 3 installed in the lens 2, and a socket 8 fixed on the rear side of the circuit board 3. The circuit board 3 is provided with plural through holes 31 and at least a positioning hole 32. The socket 8 is provided with a plugging groove 80 formed in one side, at least two plugging holes 81 formed in the plugging groove 80, and at least two terminals 83 respectively inserted into one of the plugging holes 81. Located at one end of each of the terminals 83 is a conductive pin 84, which is to be plugged through a slot 82 bored in the bottom of each of the plugging holes 81 to extend outward to connect with the circuit board 3. Further, a guiding groove 85 is formed in two corresponding sidewalls of the plugging groove 80 respectively. In addition, plural connecting members 86 are set on one side of the socket 8 to correspondingly engage with the through holes 31 of the circuit board 3, and at least a projecting bar 87 is planted on the same side of the socket 8 to correspond to the positioning hole 32 of the circuit board 3. The connecting members 86 are respectively bored with a threaded hole axially. Therefore, with the connecting members 86 of the socket 8 locked in the through holes 31 of the circuit board 3 and engaged with screws 88 inserted through the through holes 31 of the circuit 3, the socket 8 can be easily combined with the circuit board 3.

Figure 11:
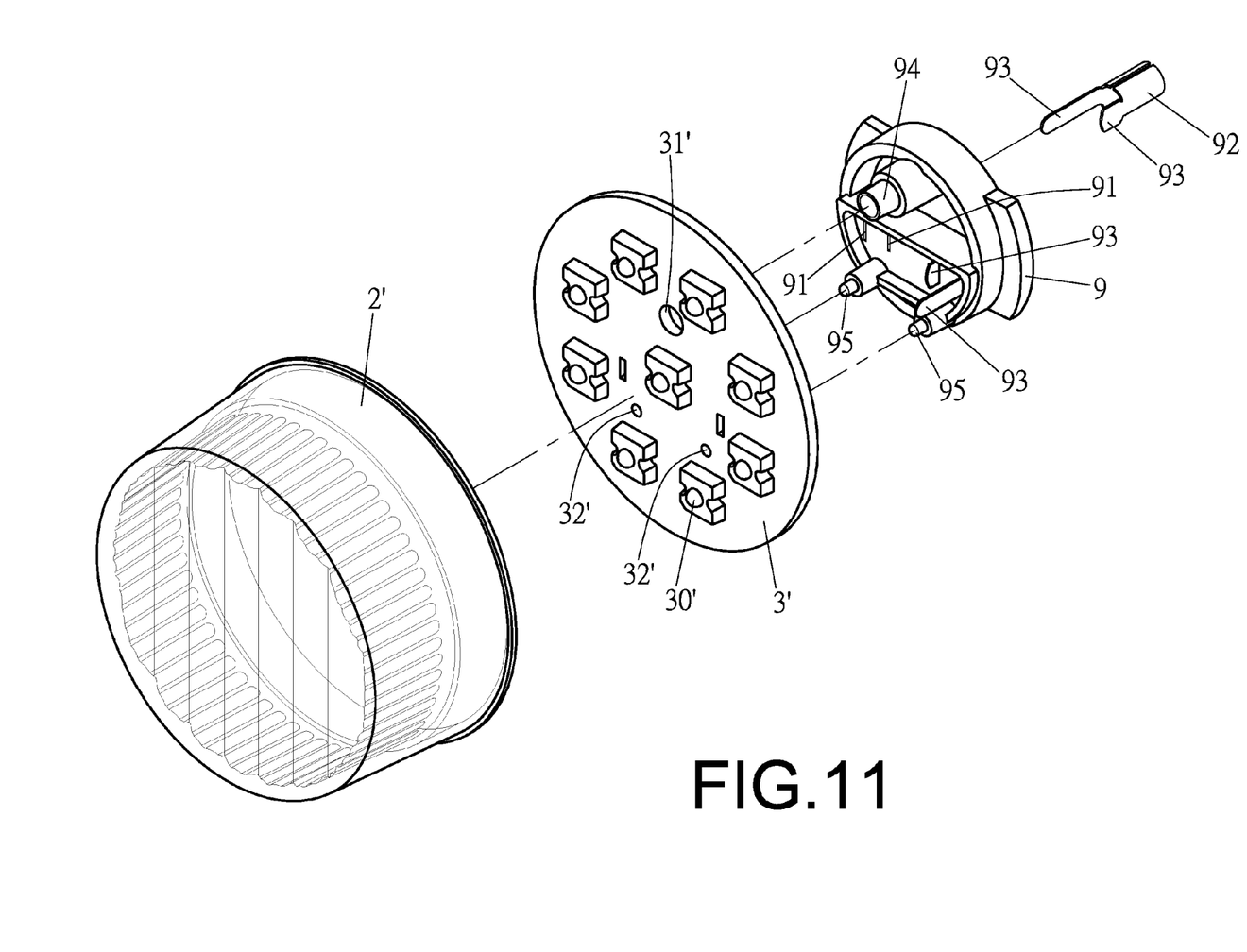
FIG. 11 is an exploded perspective view of a fourth preferred embodiment of a socket for a baseless vehicle light in the present invention.
Figure 12:
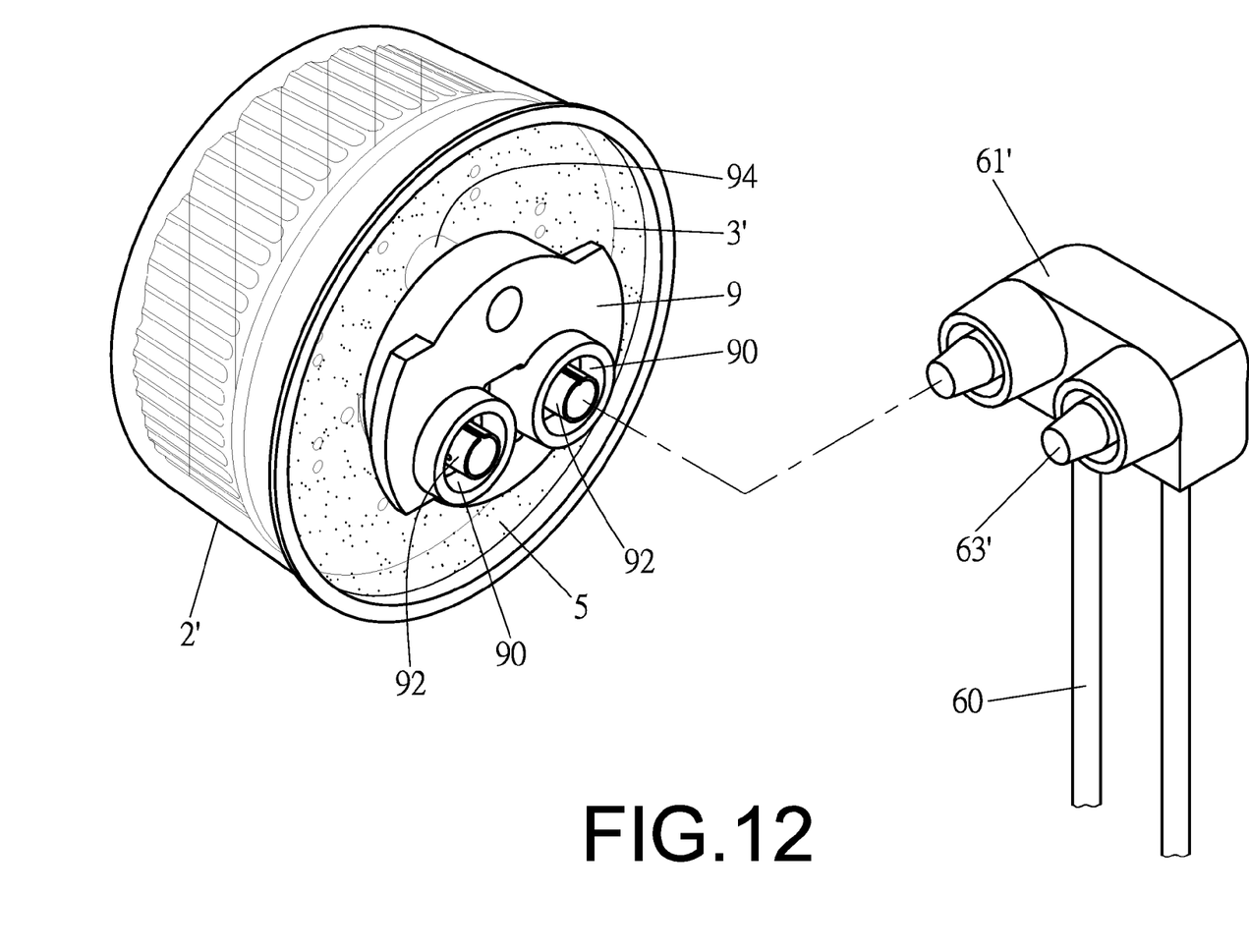
FIG. 12 is a perspective view of the fourth preferred embodiment of a socket for a baseless vehicle light in the present invention.

Finally, FIGS. 11 and 12 show a fourth preferred embodiment of a socket 9 for a baseless vehicle light in the present invention. Mostly like the first embodiment, this preferred embodiment includes a lens 2', a circuit board 3' installed in the lens 2', and the socket 9 fixed on the rear side of the circuit board 3'. The circuit board 3' is provided with plural LEDs 30', a through hole 31' and two positioning holes 32'. The socket 9 is provided with two plugging holes 90 formed in one side, two slots 91 formed inside each of the plugging holes 90, and two terminals 92 respectively inserted into one of the plugging holes 90. Formed at one end of each of the terminals 92 are two conductive pins 93, which are to be plugged through the slots 91 to extend outward to connect with the circuit board 3'. In addition, located at another side of the socket 9 is a connecting member 94 corresponding to the through hole 31' of the circuit board 3', and two projecting bars 95 corresponding to the positioning holes 32' of the circuit board 3'. In assembling, with the free end of the connecting member 94 deformed by pressing to fix on the circuit board 3', the socket 9 can be thus combined with the circuit board 3'. Next, a waterproof resin 5 is injected into the lens 2' to enable the circuit board 3' and the socket 9 sheltered by the waterproof resin 5 and fixed in the lens 2'. Therefore, the socket 9 can be easily plugged by two terminals 63' of a plug 60' of a vehicle's power cable.

While the preferred embodiment of the invention has been described above, it will be recognized and understood that various modifications may be made therein and the appended claims are intended to cover all such modifications that may fall within the spirit and scope of the invention.

What is claimed is:

1. A socket for a baseless vehicle light, said baseless vehicle light comprising a lens, a circuit board installed in said lens, said socket fixed on said circuit board for being plugged by a plug of a power cable of an vehicle; and said vehicle light characterized by having plural through holes provided in said circuit board, said socket fixed on a rear side of said circuit board and provided with a plugging groove formed in one side, at least two plugging holes formed in said socket, a slot bored in a bottom side of each said plugging hole, at least two terminals respectively inserted into one of said plugging holes, a conductive pin located at one end of each of said terminals to pass through said slot to extend outward to connect with said circuit board, plural connecting members set on one side of said socket to correspondingly engage with said through holes of said circuit board so as to enable said socket fixed on said circuit board, a waterproof resin injected into said lens to cover on said circuit board and one side of said socket so as to simultaneously keep said circuit board positioned in said lens.

2. The socket for a baseless vehicle light as claimed in claim 1, wherein said connecting members of said socket are compressed to combine with said circuit board.

3. The socket for a baseless vehicle light as claimed in claim 1, wherein said connecting members are formed as locking bodies for engaging with said through holes of said circuit board so that said socket is fixed on said circuit board.

4. The socket for a baseless vehicle light as claimed in claim 1, wherein said connecting members are respectively bored with a threaded hole for being engaged with a screw that is previously inserted through said through hole of said circuit board, so that said socket is fixed on said circuit board.

5. The socket for a baseless vehicle light as claimed in claim 1, wherein a guiding groove is formed in two corresponding sidewalls of said plugging groove respectively to guide a plug to enter into said socket.

6. The socket for a baseless vehicle light as claimed in claim 1, wherein said circuit board is further provided with at least a positioning hole to correspond to a projecting bar that is provided on one side of said socket.

* * * * *